US012274666B2

(12) United States Patent
To et al.

(10) Patent No.: US 12,274,666 B2
(45) Date of Patent: Apr. 15, 2025

(54) WOUND AND INFECTION CARE BATH SYSTEMS AND DEVICES

(71) Applicants: Mississippi State University, Mississippi State, MS (US); Jeffrey Clark, Madison, MS (US)

(72) Inventors: S. D. Filip To, Mississippi State, MS (US); Jeffrey Clark, Madison, MS (US)

( * ) Notice: Subject to any disclaimer, the term of this patent is extended or adjusted under 35 U.S.C. 154(b) by 420 days.

(21) Appl. No.: 17/691,828

(22) Filed: Mar. 10, 2022

(65) Prior Publication Data

US 2022/0287911 A1 Sep. 15, 2022

Related U.S. Application Data

(60) Provisional application No. 63/159,294, filed on Mar. 10, 2021.

(51) Int. Cl.

*A61H 33/06* (2006.01)
*A61H 33/00* (2006.01)
*A61H 33/08* (2006.01)

(52) U.S. Cl.

CPC ........... *A61H 33/063* (2013.01); *A61H 33/08* (2013.01); *A61H 33/6005* (2013.01); *A61H 33/6068* (2013.01); *A61H 2033/061* (2013.01); *A61H 2201/0242* (2013.01); *A61H 2201/5082* (2013.01)

(58) Field of Classification Search

CPC .......... A61H 2033/061; A61H 33/0087; A61H 33/027

See application file for complete search history.

(56) References Cited

U.S. PATENT DOCUMENTS

| | | | | |
|---|---|---|---|---|
| 6,438,768 B1 * | 8/2002 | Yen | A61H 35/006 601/166 |
| 9,168,199 B2 * | 10/2015 | Li | A61M 35/00 |
| 9,918,896 B2 * | 3/2018 | Tsang | A61H 33/026 |
| 2003/0220593 A1 * | 11/2003 | Morton | A61H 35/006 601/154 |
| 2021/0022957 A1 * | 1/2021 | Yoo | A61H 35/006 |
| 2023/0030355 A1 * | 2/2023 | Edgar | A61F 7/0053 |

* cited by examiner

*Primary Examiner* — Christine J Skubinna

(74) *Attorney, Agent, or Firm* — Bradley Arant Boult Cummings LLP; Michael Casey Williams; Jessica L. Zurlo

(57) ABSTRACT

Systems, devices, and methods for treating wounds and infections by immersion therapy are provided along with methods for the use thereof. The systems and devices may include a basin and a heater-blower apparatus. The systems and devices aerate, agitate, and slow the cooling of a liquid in the basin to aid the blood-flow, debridement, and medication of a wound or infection.

17 Claims, 12 Drawing Sheets

WOUND AND INFECTION CARE BATH SYSTEMS AND DEVICES

CROSS-REFERENCE TO RELATED APPLICATIONS

This application claims priority to and the benefit of U.S. Application Ser. No. 63/159,294 titled "Wound and Infection Care Bath System" and filed Mar. 10, 2021, the specification and claims of which are hereby incorporated herein by reference.

FIELD OF INVENTION

This disclosure relates generally to the treatment of wounds and infections, and particularly to systems and devices for immersion-therapy treatment of wounds and infections in humans and animals. Uses for these systems and devices may include, but are not limited to: treating wounds and infections, or promoting healthier hygiene, on or around the feet, toes, ankles, hands, fingers, knees, arms, and elbows (and equivalents); aerating, agitating, and slowing the cooling of a liquid in a basin to aid the blood-flow, debridement, and medication of a wound or infection on a body part submersed therein; and mixing heated air into a liquid for the above purposes.

BACKGROUND

In the field of treatment of wounds and infections and promoting healthier hygiene, some wounds and infections are treated by irrigation therapy that may include medicated water or an aqueous saline solution. For example, some wounds and infections are treated by immersion in a warm liquid—such as water, medicated water, or an aqueous saline solution. To aid the blood-flow, debridement, and medication of a wound or infection, it is desirable to aerate, agitate, and slow the cooling of the warm liquid.

One problem with current systems and devices designed for foot bath irrigation is that the liquid cools too quickly and does not stay at a desired temperature for long enough. Current systems and devices that actively heat the liquid are also not power-efficient. Yet another problem with whirlpool systems designed for wound care therapy is that the devices are large, not portable, and are shared by multiple patients despite being difficult or impossible to fully sanitize between uses. Furthermore, these devices are not designed for home therapy and increase the cost of healthcare while decreasing the quality of life and convenience for the patients.

Accordingly, there remains a need in the art for improved systems and methods for maintaining a desired temperature of a liquid by efficiently slowing the cooling of the liquid and for increasing the hygienicity, portability, efficiency, and safety of treating wounds and infections.

SUMMARY OF THE INVENTION

The present disclosure describes wound- and infection-care bath systems and devices. Systems, devices, and methods for treating wounds and infections by immersion therapy are provided along with methods for the use thereof. The systems and devices may include a basin and a heater-blower apparatus. The systems and devices aerate, agitate, and slow the cooling of a liquid in the basin to aid the blood-flow, debridement, and medication of a wound or infection.

In a first exemplary embodiment, a device for treating wounds is disclosed, comprising: a heater-blower apparatus having a housing comprising an impeller-assembly and a heating-element, wherein the impeller-assembly comprises an intake pipe and an output pipe coupled thereto and is configured to move air into the intake pipe, across the heating-element, and out of the output pipe, wherein the heating-element is configured to heat air that moves across the heating-element; a basin having a floor, a sidewall, a bottom surface, and an air-channel configured to receive the output pipe; and at least one nozzle-strip having one or more nozzle-holes and configured to attach to the floor of the basin and to substantially cover the air-channel.

In a second exemplary embodiment, a device for treating wounds is disclosed, comprising: a heater-blower apparatus for heating air and for moving air, wherein the heater-blower apparatus has a heater-blower housing comprising a heating-element and an impeller-assembly, the impeller-assembly having an intake pipe and an output pipe coupled thereto, wherein the impeller-assembly is configured to move air into the intake pipe, across the heating-element, and out of the output pipe, wherein the heating-element is configured to heat air that moves across the heating-element; a switch coupled to the heater-blower apparatus and configured to turn the heater-blower apparatus on and off; a basin for holding a liquid, wherein the basin has a floor, a sidewall, a bottom surface, and at least one air-channel, wherein the air-channel is a recess in the floor and has an output-pipe hole coupled to the output pipe; at least one nozzle-strip having one or more nozzle-holes and that is coupled to the floor of the basin and substantially covers the at least one air-channel; and a bottom-cover having an intake-pipe hole, wherein the bottom-cover is coupled to the basin and substantially contains the heater-blower apparatus, and wherein the intake-pipe hole is coupled to the intake pipe.

BRIEF DESCRIPTION OF THE DRAWINGS

The following drawings are attached to—and form a portion of—this disclosure:

FIG. 1B shows a bottom view of the basin of FIG. 1A.

DEFINITIONS

Figure 1A:
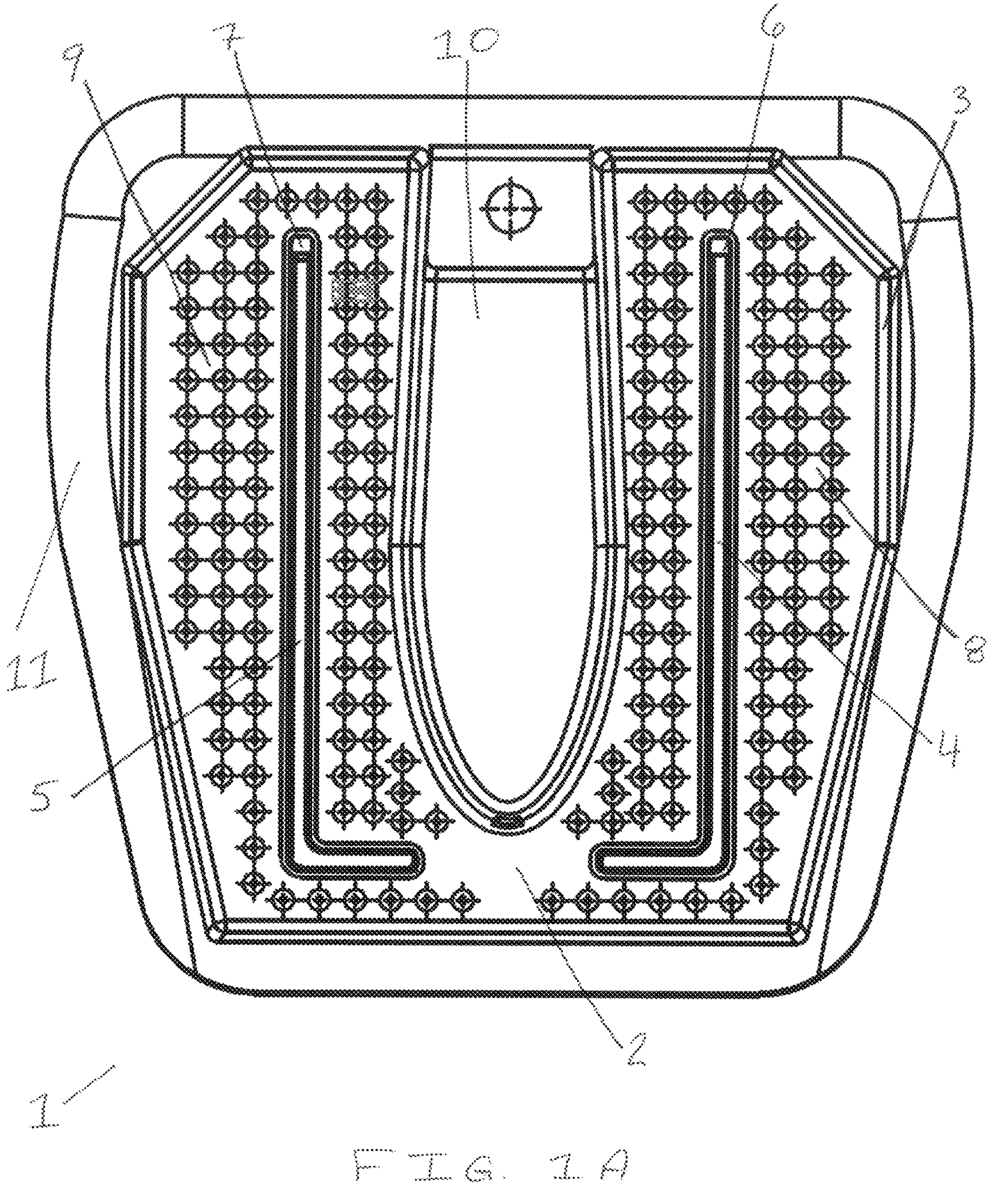
FIG. 1A shows a top view of a basin for use with a device for treating wounds according to an exemplary embodiment of the present disclosure.
Figure 18:
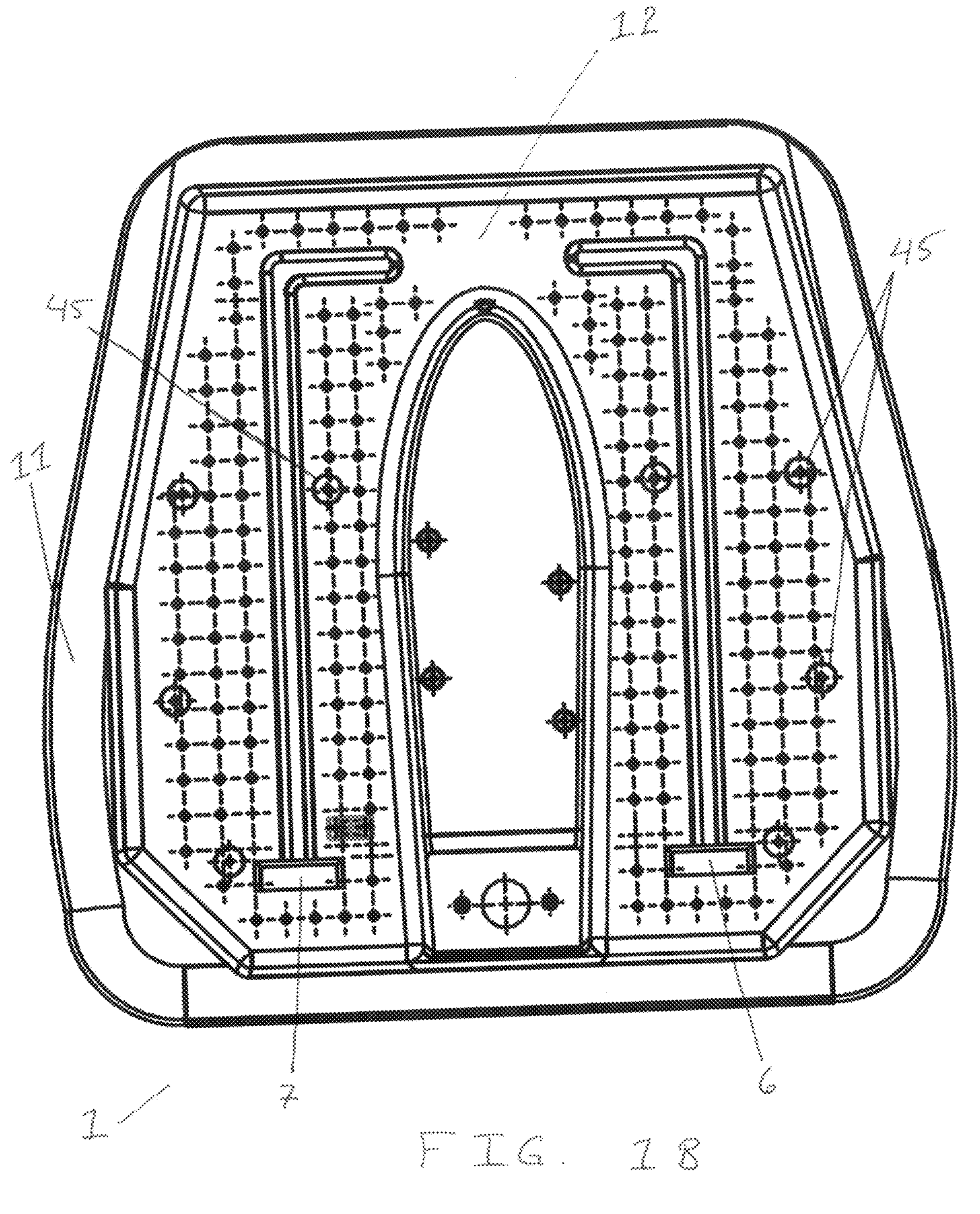
Figure 1C:
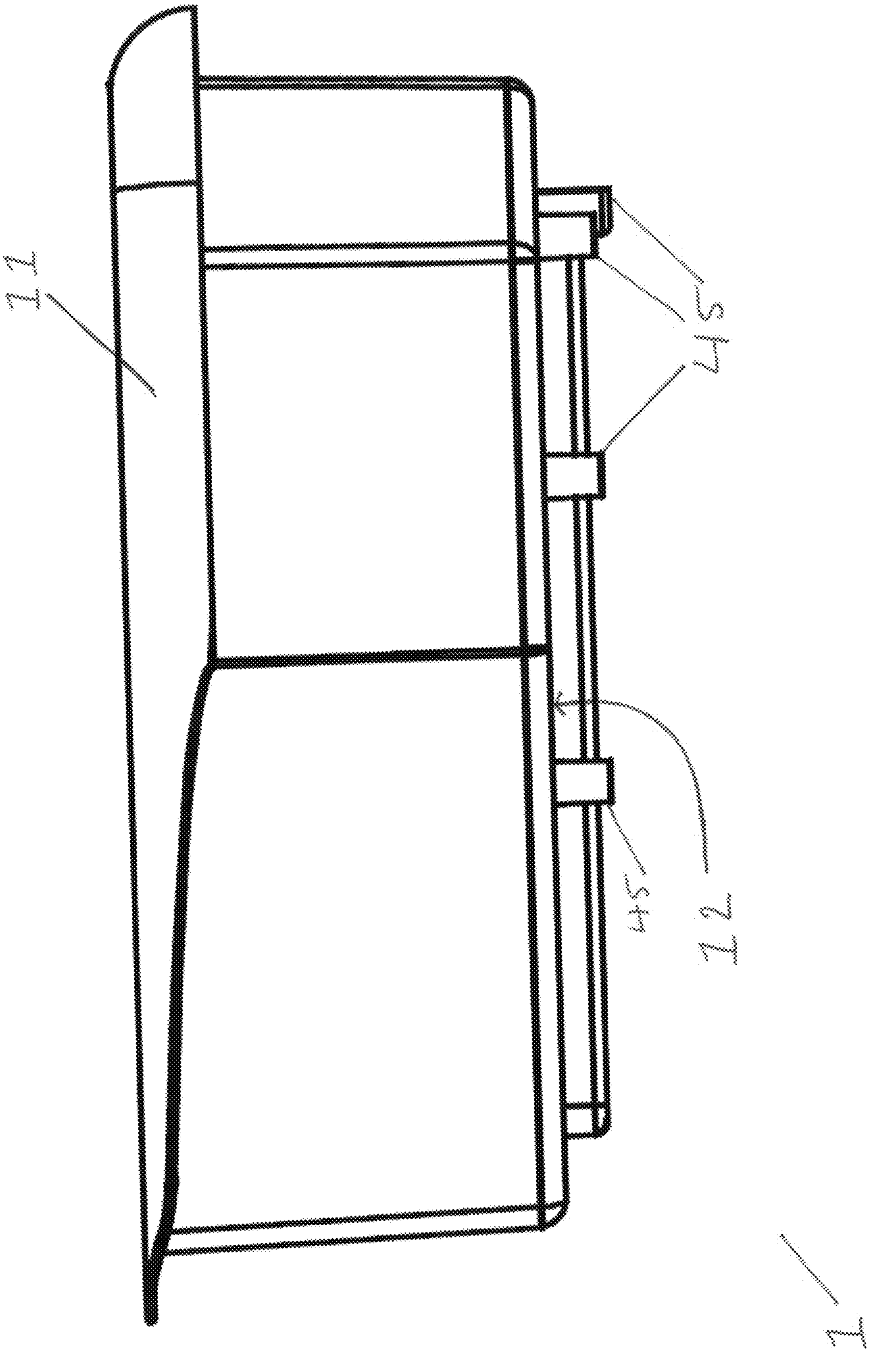
FIG. 1C shows a side view of the basin of FIG. 1A.
Figure 1D:
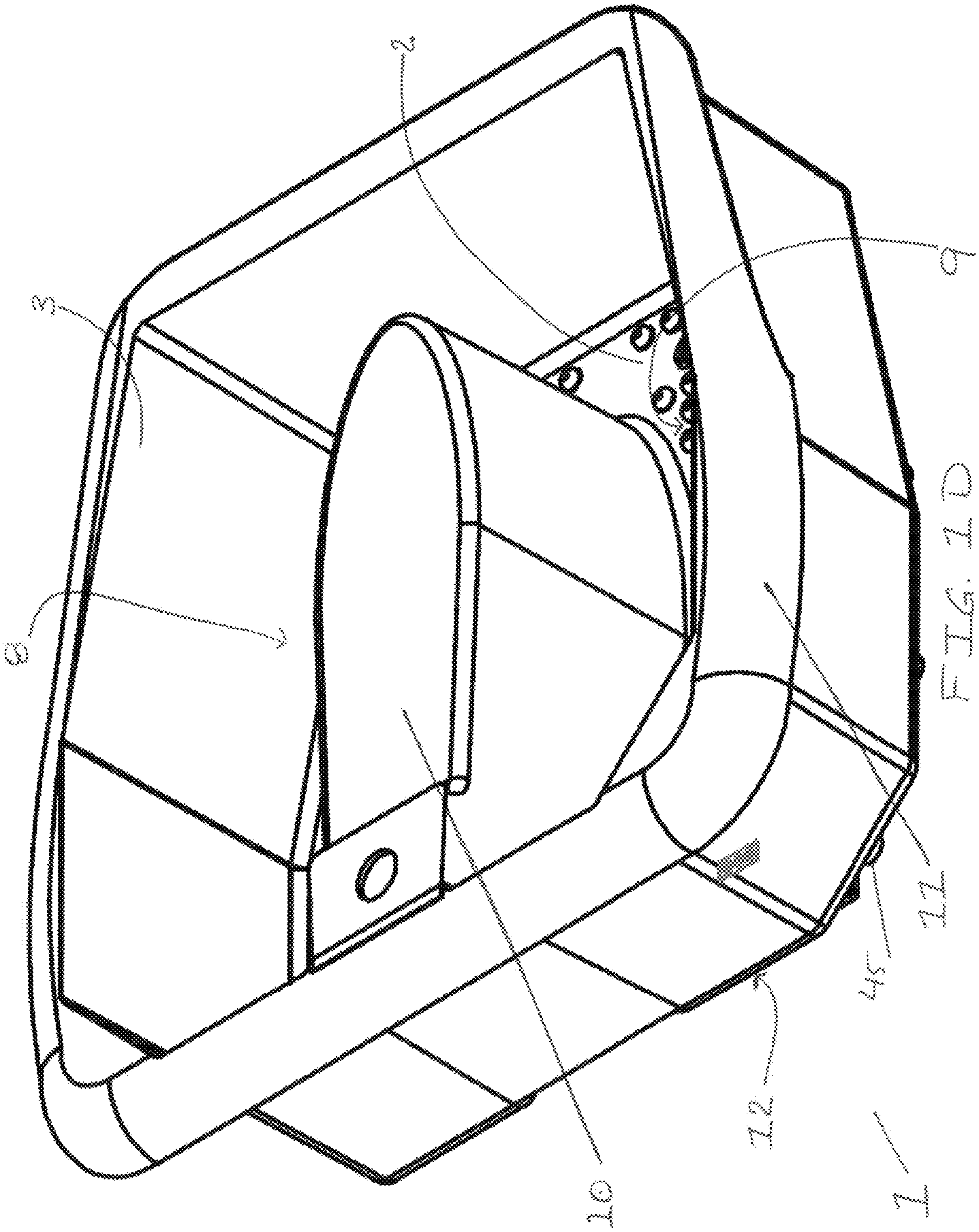
FIG. 1D shows a perspective view of the basin of FIG. 1A.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms “about” and “approximately” shall generally mean an acceptable degree of error or variation for the quantity measured in light of the nature or precision of the measurements. Numerical quantities given in this description are approximate unless stated otherwise, meaning that the term “about” or “approximately” can be inferred when not expressly stated.

The terminology used throughout the disclosure is for the purpose of describing particular embodiments only and is not intended to be limiting. The singular forms “a,” “an,” and “the” are intended to include the plural forms as well, unless the context clearly indicates otherwise.

The terms “first,” “second,” and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like “top” and “bottom”; “front” and “back”; and “left” and “right” are used to distinguish certain features or elements from each other, but it is expressly contemplated that a top could be a bottom, and vice versa.

The terms “connected to,” “in connection with,” “in communication with,” or “connecting” include any suitable connection or communication, including mechanical connection, electrical connection (e.g.: one or more wires), or signal-conducting channel (e.g., Bluetooth®, Near-Field Communication (NFC), or other inductive coupling or radio-frequency (RF) link).

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art. The embodiments described are further intended to explain certain best modes known of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Systems and devices for treating wounds and/or infections by immersion therapy (and methods for using such systems) have been developed and are described.

FIGS. 1A-1D show a basin 1 for use with the systems and devices of the present disclosure. The basin 1 is capable of holding a liquid. The liquid may be any suitable liquid including, for example, water, water mixed with a prescription medication, water mixed with a non-prescription medication, or water mixed with salt. The basin 1 is made of any suitable material such as plastic (e.g., PVC or molded plastic) or hard rubber. In some embodiments, the basin 1 is made of a material that is light enough for an individual to carry even when holding a liquid and that is strong enough to not buckle when holding a liquid. In some embodiments, the basin 1 is made of a material that is thermally insulating. In such embodiments, the material of the basin 1 can help maintain a warmth of the liquid, for example by slowing the loss of heat through the material of the basin 1.

The basin 1 has a floor 2, a sidewall 3, and at least one air-channel 4, 5. The basin 1 shown in FIG. 1A has two air-channels 4, 5—a left air-channel 4 and a right air-channel 5. Other embodiments of the basin 1 may have any suitable number of air-channels 4, 5. Each air-channel 4, 5 is a recess in the floor 2 of the basin 1. Each air-channel 4, 5 has an output-pipe hole 6, 7 that is a through hole in the floor 2 of the basin 1.

The floor 2 of the basin 1 shown in FIG. 1A is shaped as a horseshoe and has a left-shank area 8 and a right-shank area 9. Substantially between the left-shank area 8 and the right-shank area 9 the basin 1 has a plateau 10. In some embodiments, the size and shape of the basin 1 accommodates two human feet (e.g., male size-15 feet) on the floor 2 (e.g., a left foot in the left-shank area 8 and a right foot in the right-shank area 9) while the plateau 10 reduces the amount of liquid that is needed to fill the basin 1 to a desired depth of liquid. Further, the shape of the basin equalizes the depth of liquid between the left-shank area 8 and the right-shank area 9. Other sizes and shapes of basin are possible and are desirable in other embodiments to accommodate other body parts of humans or animals. The body part could be any body part which it is desirable to treat for wound or infection, for example: toe, ankle, foot, hand, finger, wrist, knee, arm, or elbow of animal or human patients (including diabetic patients). In some embodiments, the basin 1 is sized to allow only a single user at a time. In some embodiments, the floor 2 of the basin is textured to prevent slipping of the body part along the floor 2. In some embodiments, the floor 2 of the basin is textured or padded to promote comfort of the body part.

The basin 1 shown in FIG. 1A has a handle 11. The handle 11 is an extension of the sidewall 3 that extends outwardly. The handle 11 provides a surface for the user to hold and carry the basin 1 safely, with a sure grip, and without spilling liquid. In some embodiments, the handle 11 is textured to promote grip surety.

FIG. 1B shows a bottom view of the basin 1 of FIG. 1A. In addition to the elements described above, FIG. 1B shows that the basin 1 has a bottom surface 12. The bottom surface 12 is molded with basin-fittings 45 that allow the attachment of the bottom-cover 23 (described below). (Not every basin-fitting 45 is marked with a reference numeral on FIG. 1B; instead, a few are marked as examples.) The basin-fittings 45 are cylinder-shaped, male snap-fit connectors that connect with cover-fittings 46 (described below) on the bottom-cover 23.

Figure 2:
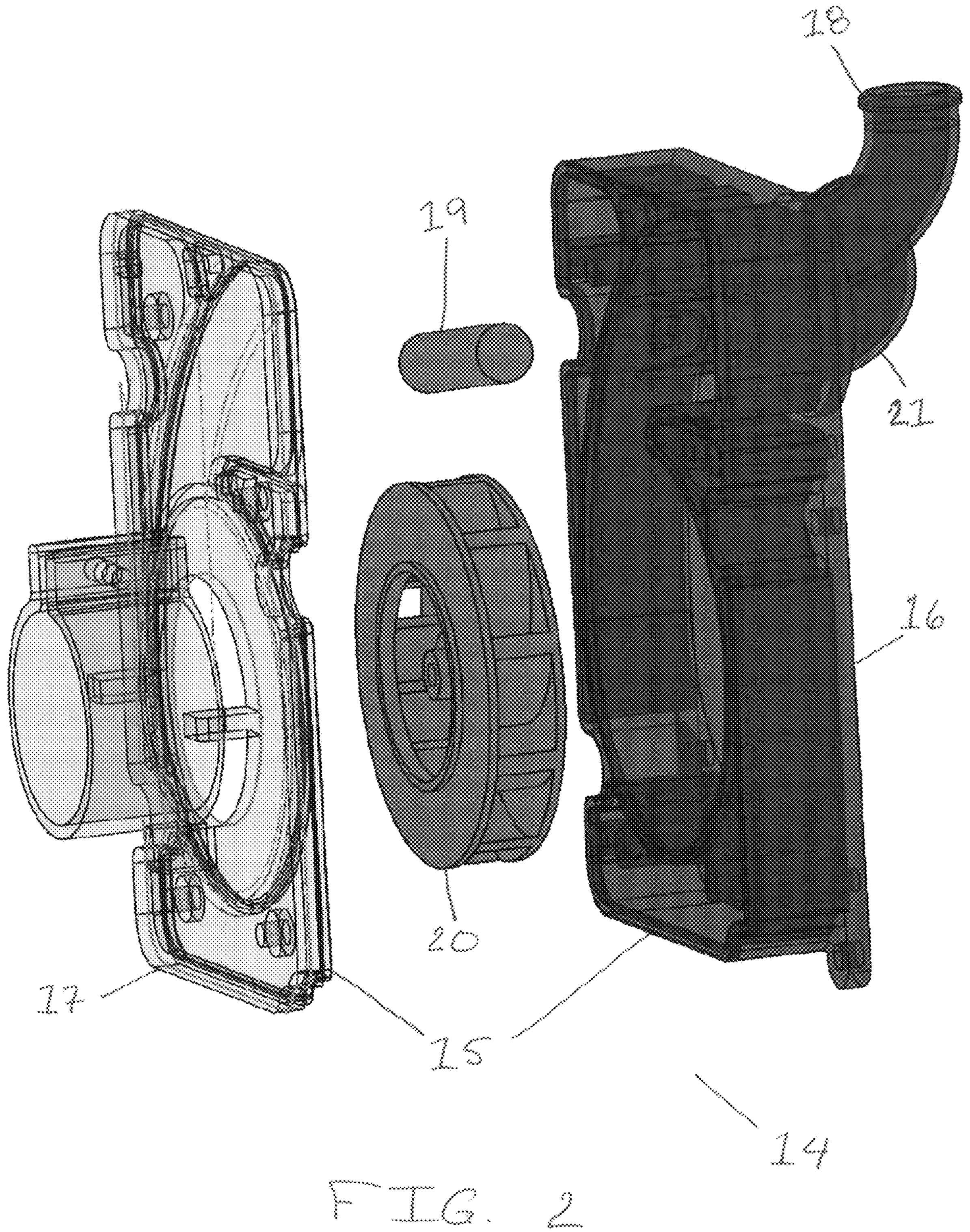
FIG. 2 shows an exploded perspective view of a heater-blower apparatus for use with a device for treating wounds according to an exemplary embodiment of the present disclosure.

FIG. 2 shows an exploded perspective view of a heater-blower apparatus 14 for use with the systems and devices of the present disclosure. The heater-blower apparatus 14 is for heating and moving air. The heater-blower apparatus 14 may be any suitable apparatus for introducing a current of heated air into the basin 1. The heater-blower apparatus 14 that is shown in FIG. 2 has a heater-blower housing 15. Specifically, the heater-blower housing 15 has two parts: a heater-blower top cover 16; and a heater-blower bottom cover 17.

The heater-blower apparatus 14 has an intake pipe 18, a heating-element 19, an impeller-assembly 20, and an output pipe 21. The heater-blower apparatus 14—specifically the impeller-assembly 20—moves air: first, into and through the intake pipe 18; then, across the heating-element 19; and finally, through and out of the output pipe 21.

The intake pipe 18 may be any suitable pipe and may be integral with the heater-blower housing 15. In FIG. 2, the intake pipe 18 is integral with the heater-blower top cover 16. In other embodiments, the intake pipe 18 is a hole in the heater-blower housing 15.

The heating-element 19 heats air that moves across the heating element 19. In FIG. 2 the heating-element 19 is a resistive heating-element that becomes hotter when an electrical current flows through the heating-element (e.g., due to Joule heating). When air moves across the heating-element 19, heat is transferred from the heating-element 19 to the air and the air is consequently heated. The heating-element 19 shown in FIG. 2 is a 220-240-volt heater cartridge which receives a direct-current voltage of less than approximately 48 volts. One example of a heating-element 19 is the 220V Mold Heating Element available from KASUKI as part number KSK-375570907E25965B9EBF14B25C5CD400.

The output pipe 21 may be any suitable pipe and may be integral with the heater-blower housing 15. In FIG. 2, the output pipe 21 is integral with the heater-blower top cover. In some embodiments, the output pipe 21 is a hole in the heater-blower housing 15. The output pipe 21 is coupled to at least an output-pipe hole (e.g., left output-pipe hole 6 and/or right output-pipe hole 7) such that air can flow out of the output pipe 21 into at least one air-channel (e.g., left air-channel 4 and/or right air-channel 5). The output pipe 21 is connected to the air-channel 4, 5 by a flexible or rigid tubing (not shown).

The impeller-assembly 20 may be any device suitable for moving air: first, into and through the intake pipe 18; then, across the heating-element 19; and finally, through and out of the output pipe 21. The impeller-assembly 20 in FIG. 2 has a closed centrifugal impeller with curved blades. The impeller-assembly 20 is operated by applying suitable electrical current to the impeller-assembly. The impeller-assembly 20 may be a fan that is powered by direct-current ("DC") electricity. Alternatively, the impeller-assembly 20 may be a fan that is powered by alternating-current ("AC") electricity. In some embodiments, a DC-powered impeller-assembly 20 is preferable due to having a smaller size than an AC-powered impeller-assembly. The impeller-assembly 20 is driven, for example, by Small Motor DC 24V 7600 RPM High Speed Motor available from UXCELL as part number A17082900ux0296.

The heater-blower housing 15 contains the impeller-assembly 20 and the heating element 19, protecting a user from potential mechanical, electrical, and thermal dangers of by the heater-blower apparatus 14. The heater-blower housing 15 couples the intake pipe 18 and the output pipe 21 to the impeller-assembly 20, so that the impeller-assembly 20 can move air both: into and through the intake pipe 18; and through and out of the output pipe 19.

The heater-blower apparatus 14 is sized, shaped, and powered to create an air pressure at the output pipe 21 of between 1.0 pounds per square inch gauge ("psig") and 11 psig, preferably between 2.0 psig and 10. psig, and more preferably between 3.0 psig and 9.0 psig.

A switch 22 (shown in FIGS. 4, 6, and 7) is coupled (e.g., electrically connected with) the heater-blower apparatus 14. The switch 22 is an electrical switch that turns the heater-blower apparatus 14 on and off. Specifically, the switch 22 can be toggled between an "closed" state (in which the switch 22 conducts electrical current to the heater-blower apparatus 14) and a "open" state (in which the switch 22 does not conduct electrical current to the heater-blower apparatus 14). When the switch 22 is in a closed state, the heater-blower apparatus is on. When the switch 22 is in an open state, the heater-blower apparatus is off.

Figure 3A:
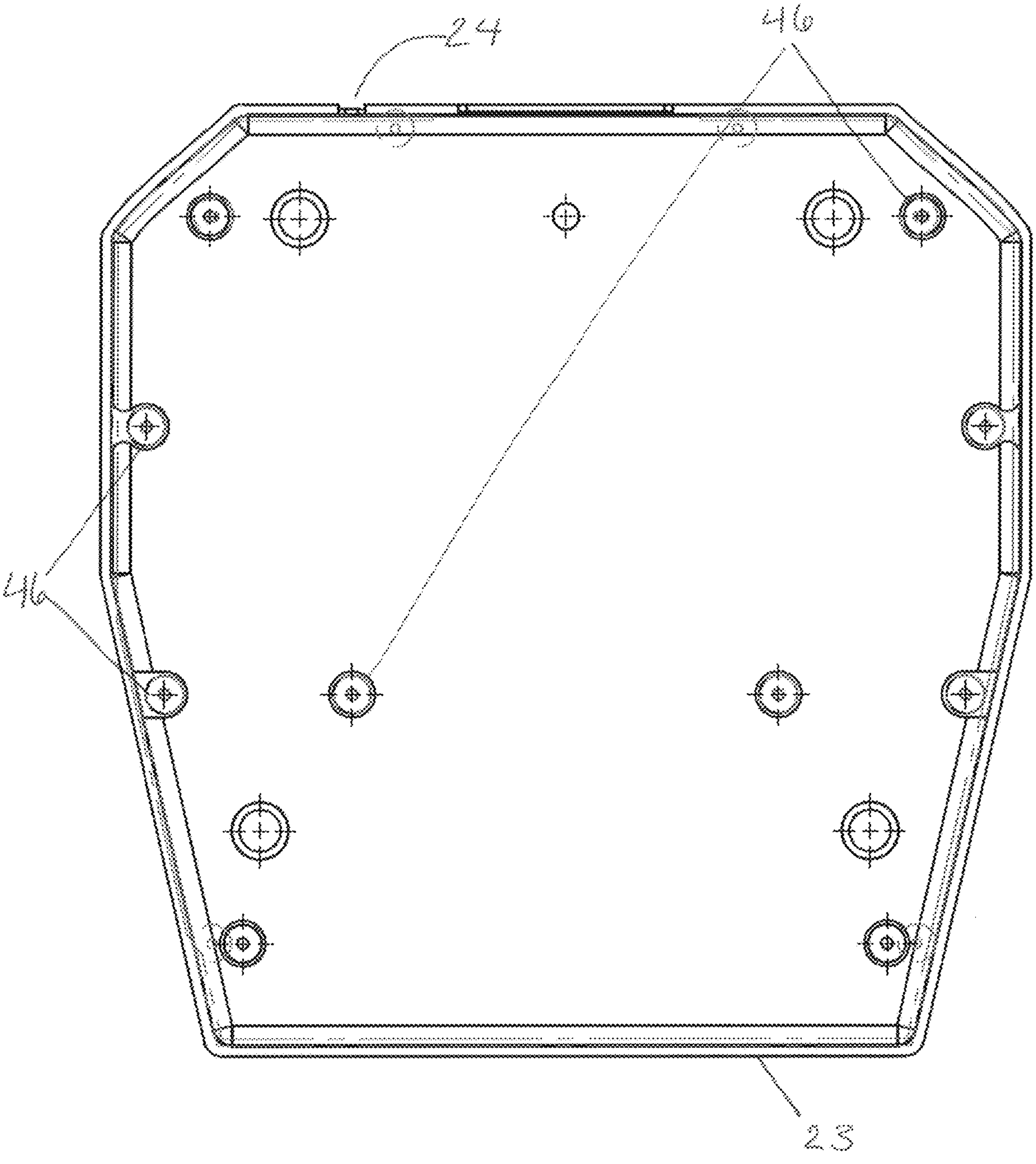
FIG. 3A shows a top view of a bottom-cover for use with a device for treating wounds according to an exemplary embodiment of the present disclosure.

FIG. 3A shows a top view of a bottom-cover 23. The top-view silhouette of the bottom-cover 23 has a size and shape similar to the top-view silhouette of the bottom surface 12 of the basin 1. The bottom-cover 23 can attach to the basin 1. When the bottom-cover 23 is attached to the basin 1, the bottom-cover 23 substantially contains the heater-blower apparatus 14 between the bottom-cover 23 and the bottom surface 12 of the basin 1. The bottom-cover 23 has an intake-pipe hole 24, which is a through hole in the bottom-cover 23. The intake-pipe hole 24 is sized to receive the intake pipe 18. The intake-pipe hole 24 allows air that is outside the space between the bottom-cover 23 and the bottom surface 12 of the basin 1 to move into the intake pipe 18 when the heater-blower apparatus 14 is on. In some embodiments, the intake-pipe hole 24 is not a through hole in the bottom cover 23 but is instead a gap that exists between the bottom-cover 23 and the basin 1 when the bottom-cover 23 is attached to the basin 1.

The bottom-cover 23 is molded with cover-fittings 46 that allow the attachment to the bottom surface 12 of the basin 1 (described above). (Not every cover-fitting 46 is marked with a reference numeral on FIG. 3A; instead, a few are marked as examples.) The cover-fittings 45 are cylinder-shaped, female snap-fit connectors that connect with basin-fittings 45 (described above) on the bottom surface 12 of the basin 1. When the cover-fittings 46 and the basin-fittings 45 are aligned and pressed together, the snap-fit connection holds the bottom-cover 23 to the bottom surface 12 of the basin 1, leaving a volume between the bottom-cover 23 and the bottom surface of the basin 1 in which the heater-blower apparatus 14 is contained.

Figure 3B:
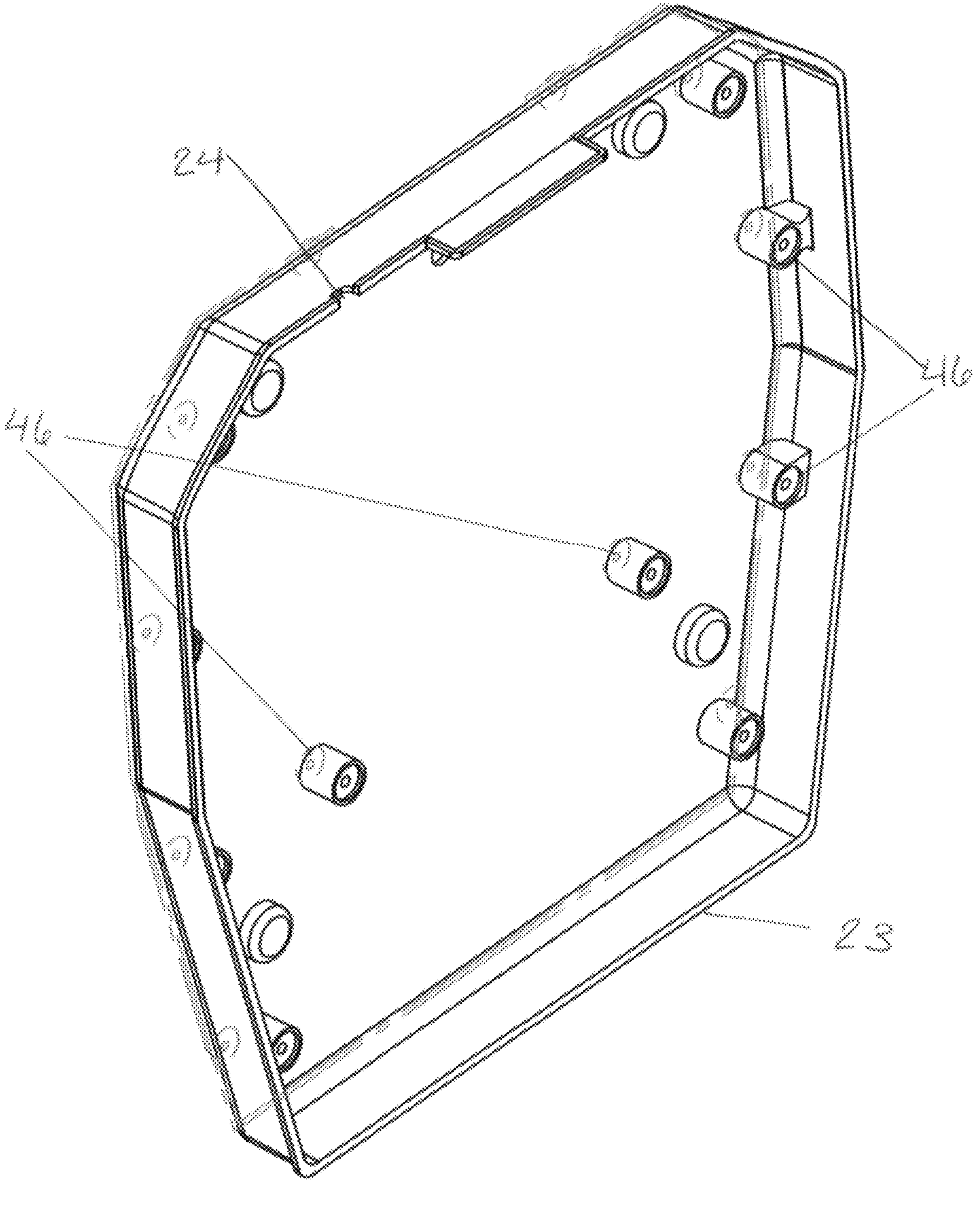
FIG. 3B shows a perspective view of the bottom-cover of FIG. 3A.

FIG. 3B shows a perspective view of the bottom-cover 23 of FIG. 3A. In some embodiments, the bottom-cover 23 has a cavity (not shown) with a spooling facility for storage of an AC and/or DC power cord for the impeller-assembly 20 when the system is not in use.

Figure 4:
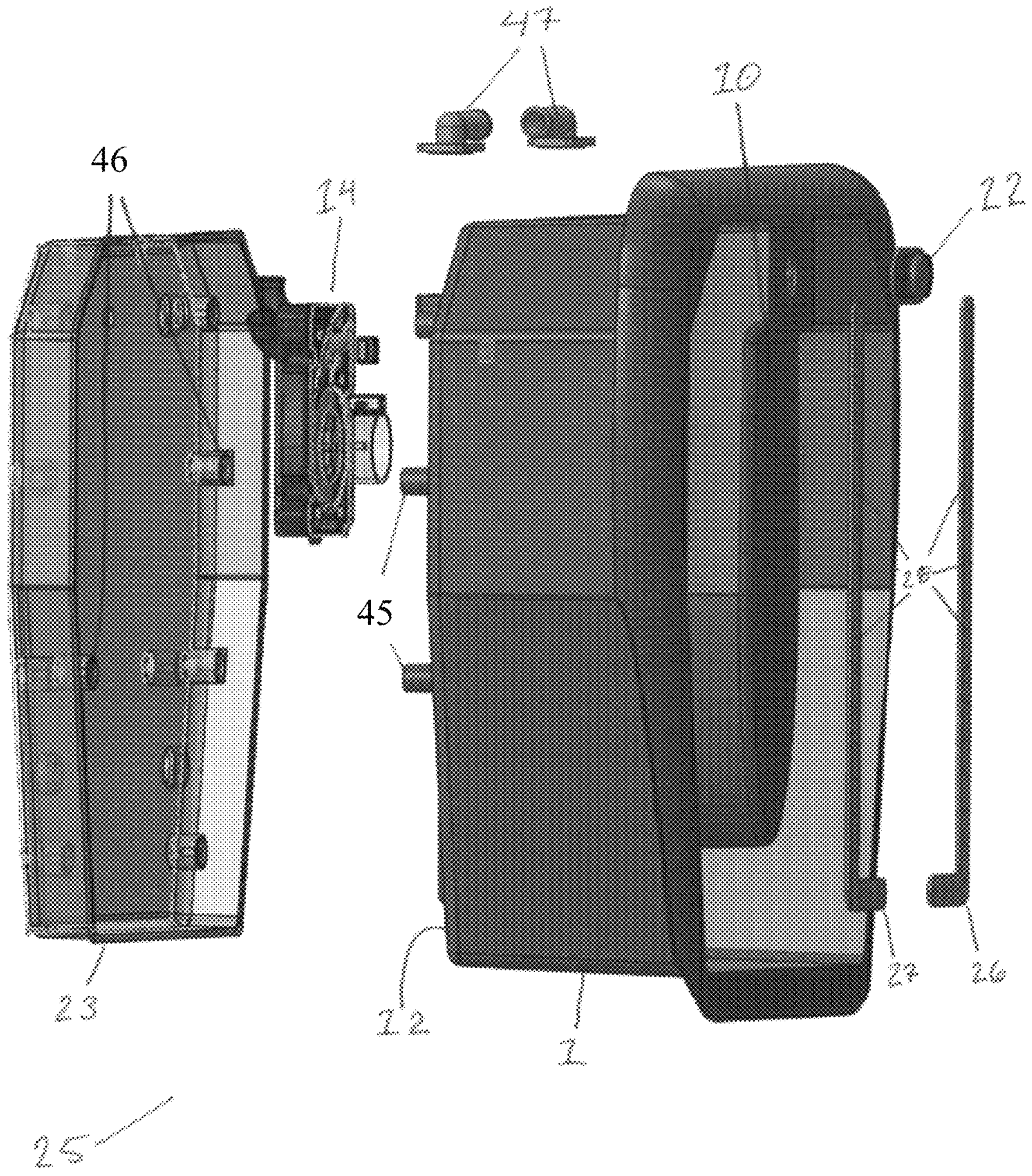
FIG. 4 shows an exploded perspective view of a system for treating wounds according to an exemplary embodiment of the present disclosure.

FIG. 4 shows an exploded perspective view of a system 25 for treating wounds. The system 25 includes a basin 1, a heater-blower apparatus 14, a bottom-cover 23, and a switch 22—which have been described in the foregoing. As shown in FIG. 4, the system 25 includes two nozzle-strips 26, 27. The nozzle-strips 26, 27 cover air-channels 4, 5 and have one or more nozzle-holes 28 (which are perforations or through holes in the nozzle-strips 26, 27). The system 25 shown in FIG. 4 includes two nozzle-strips: a left nozzle-strip 26; and a right nozzle-strip 27. Each nozzle-strip 26, 27 attaches to the floor 2 of the basin 1 and substantially covers at least one air-channel 4, 5. In the system 25 shown in FIG. 4, the left nozzle-strip 26 is L-shaped and substantially covers the left air-channel 4, and the right nozzle-strip 27 is L-shaped and substantially covers the right air-channel 5. When the heater-blower apparatus 14 moves air out of the output pipe 21 and into an air-channel 4, 5 (for example, through an output-pipe hole 6, 7), then the air passes through (or is pushed or forced through) the nozzle-holes 28 (for example, as a bubble-stream) into the basin 1 (including into a liquid in the basin 1). Thus, the air (which has been heated by the heater-blower apparatus 14) aerates, agitates, and adds heat to the liquid in the basin 1.

In some embodiments, the output pipe 21 is coupled to the air-channel 4, 5 by a rigid or flexible tubing (e.g., a plastic or rubber hose). Adapters 47 connect the flexible tubing to the air-channel 4, 5 or output-pipe hole 6, 7. Adapters 47 secure the flexible tubing by threads, barbs, friction, adhesive, or any other suitable method. The adapters 47 shown in FIG. 4 have a 90-degree bend to facilitate connection.

In some embodiments, the aeration irrigates and continuously provides a mixing action to mix water with any medication and to deliver the medication topically to the site of a wound or infection. In some embodiments, the aeration serves as a mechanism for blunt debridement, for increased blood-circulation at the site of the wound or infection, and/or for increased hygiene.

The switch 22 in in the system 25 of FIG. 4 is positioned on the plateau 10 of the basin 1. In some embodiments, this is a convenient location because: it is along an axis of symmetry of the assembled system 25 and therefore does not disturb the system's 25 mechanical balance along that axis of symmetry; it is near the other elements of the system 25 and therefore remains portable with the system; and it is raised above the floor 2 of the basin 1 and therefore is easy to reach by a user. The switch 22 is enclosed in a water-resistant boot (which is made of flexible rubber or any suitable material) to protect the electrical connections from the liquid in the basin 1. Thus protected, the switch 22 is rated with an Ingress Protection code of at least IP24.

Figure 5:
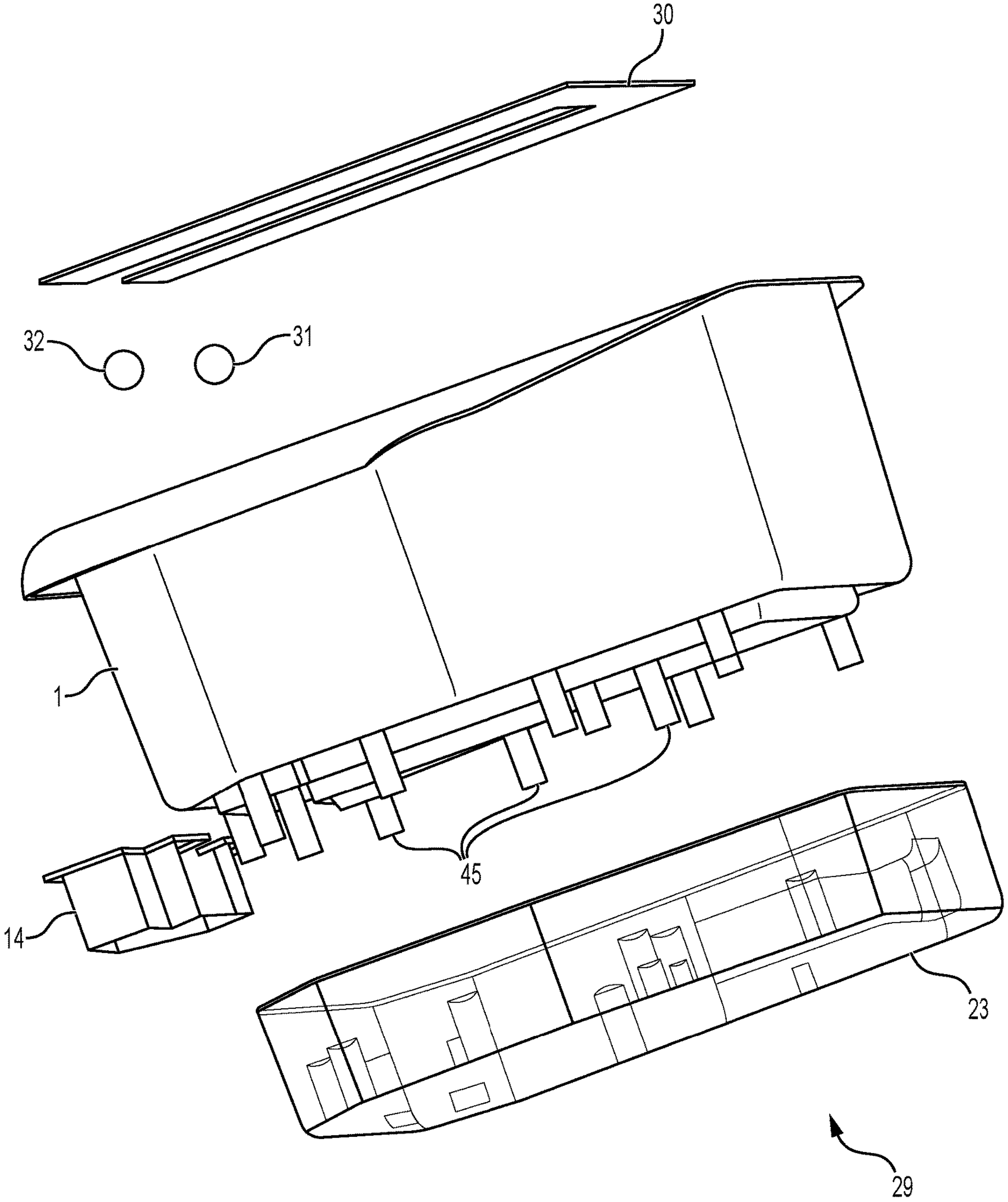
FIG. 5 shows another exploded perspective view of a system for treating wounds according to an exemplary embodiment of the present disclosure.

FIG. 5 shows an exploded perspective view of a system 29 for treating wounds. The system 29 includes a basin 1, a heater-blower apparatus 14, a bottom-cover 23, and a nozzle-strip 30—which have been described in the foregoing. The nozzle-strip 30 shown in FIG. 5 is horseshoe-shaped and substantially covers both the left air-channel 4 and the right air-channel 5.

As illustrated, the system 29 also includes two stoppers 31, 32. As shown in FIG. 5, each stopper 31, 32 is a sphere made of any suitable material (e.g., rubber or plastic). The system 29 includes two stoppers: a left stopper 31; and a right stopper 32. The left stopper 31 is proximate the left output-pipe hole 6. The right stopper 32 is proximate the right output-pipe hole 7. When the heater-blower apparatus 14 is off, each stopper 31, 32 sinks (i.e., moves down) under the force of gravity to substantially stop liquid from moving out of the basin and into the output-pipe hole 6, 7 (and thus to the heater-blower apparatus 14). When the heater-blower apparatus 14 is on, each stopper 31, 32, rises (i.e., moves up) under the force of air-pressure to allow air to enter the air-channel 4, 5 through the output-pipe hole 6, 7. Thus the at least one stopper 31, 32 protects the heater-blower apparatus 14 from ingress of the liquid in the basin 1 while allowing egress of air from the heater-blower apparatus 14. In other embodiments, the at least one stopper 31, 32 may be any suitable mechanism for preventing liquid from moving out of the basin and into the heater-blower apparatus 14 when the heater-blower apparatus 14 is off. Other embodiments have any suitable backflow-prevention system or device (or other means to prevent the water from draining into the heater-blower apparatus 14 during system operation or during initial filling of the basin with liquid) either instead or in addition to stoppers 31, 32. In some embodiments, backflow is prevented by positioning the entire heater-blower apparatus 14 or a portion of the heater-blower apparatus 14 above the desired depth of water (e.g., under the plateau 10 of the basin 1).

Figure 6:
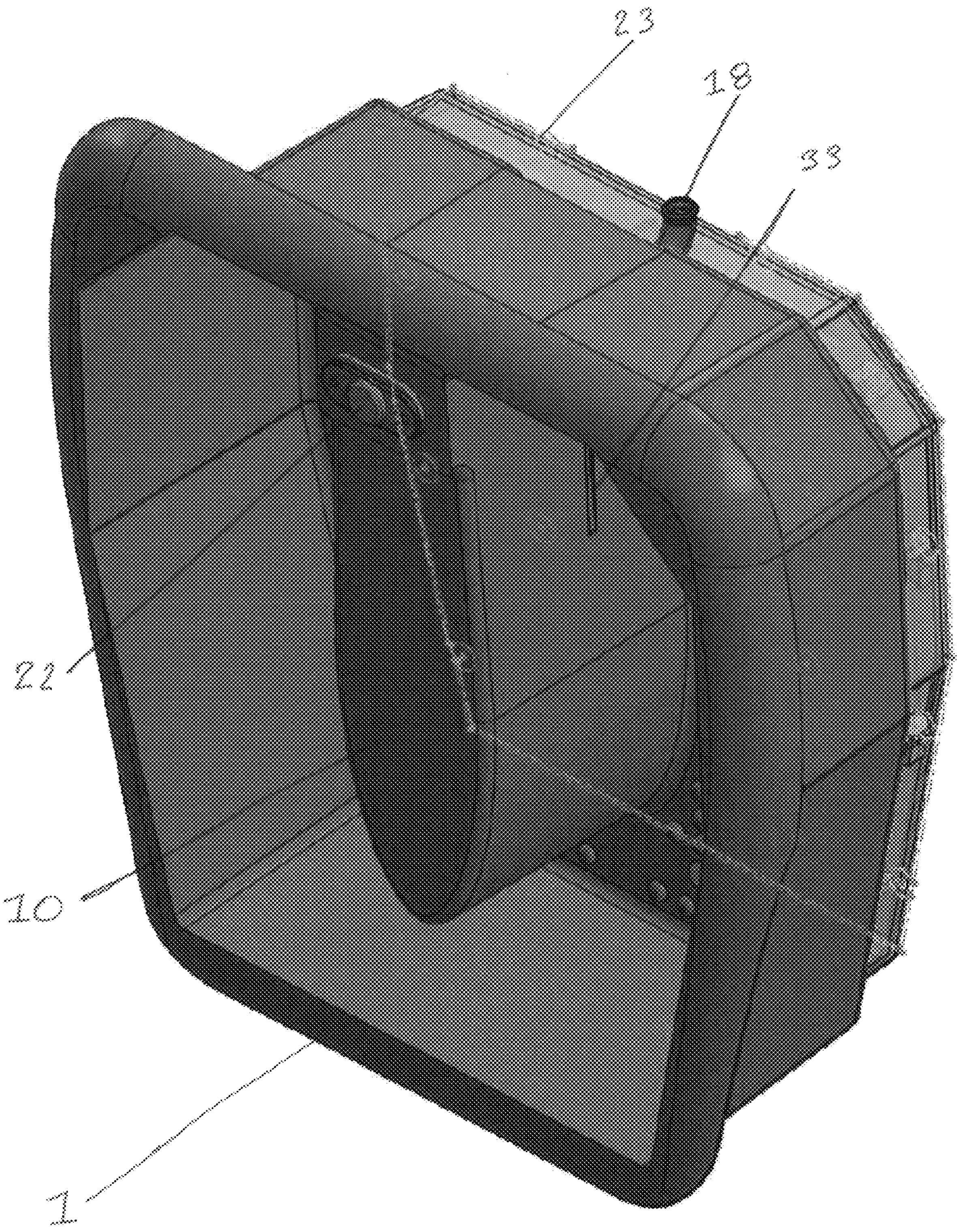
FIG. 6 shows a perspective view of the system of FIG. 4.

FIG. 6 shows a perspective view of the system 25 of FIG. 4. The basin 1 has a liquid-level-mark 33 on the sidewall 3 of the basin 1. The liquid-level-mark 33 is any suitable mark—for example, a physical indentation or embossment, a painted or inked line, a decal, or other suitable mark liquid-level-mark 33 is a height above the floor 2 of the basin 1 that corresponds to a desired depth of liquid in the basin 1. The desired depth of liquid is chosen to cover the wound without spilling out when the body part is inserted into the liquid.

When the desired depth of liquid is in the basin 1, when the liquid is at a desired warmth, and when the heater-blower apparatus 14 is on, then the system 25 maintain the desired warmth of the liquid for a desired duration. For example, the desired warmth of the liquid may be a temperature between 40 degrees Celsius and 30 degrees Celsius (preferably between 40 degrees Celsius and 35 degrees Celsius), and the desired duration may be between 10 minutes and 20 minutes (preferably 15 minutes). Then the system 25 would maintain liquid in the basin 1 at a temperature between 40 degrees Celsius and 35 degrees Celsius for at least 15 minutes. The system 25 accomplishes that by the heater-blower apparatus 14 adding heat to the liquid at a rate equal to or less than the rate at which the liquid loses heat to the system's 25 environment. In some embodiments, the rate of heat-transfer is approximately 20 watts.

In some embodiments, the system 25 further comprises a temperature-indicator (not shown) that indicates the warmth of the liquid so that a user can know whether the liquid is too warm, not warm enough, or at the desired warmth. In such embodiments, this is advantageous to users with neuropathy or numbness in the body part by preventing burns.

Figure 7:
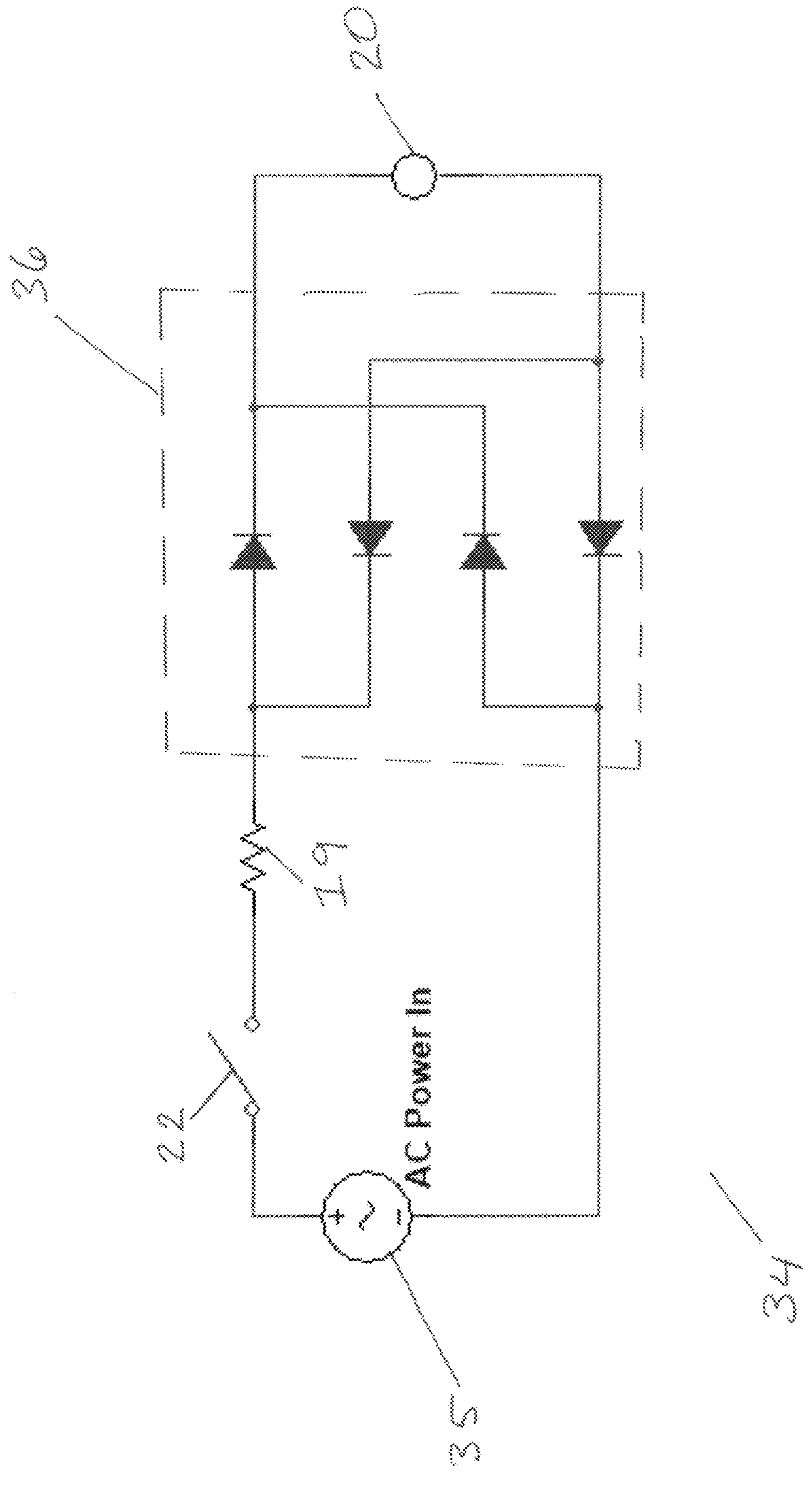
FIG. 7 is a schematic of the electrical circuitry of a system for treating wounds according to an exemplary embodiment of the present disclosure.

FIG. 7 shows a schematic of the electrical circuitry 34 of the system 25. The electrical circuitry 34 connects the switch 22 to the heater-blower apparatus 14 and facilitates the operation of the heater-blower apparatus 14. The electrical circuity 34 has a power supply 35. The power supply may be any suitable power supply that delivers alternating-current ("AC") (e.g., a battery and a direct-current-to-alternating-current converter, or a connection to the alternating-current power of a facility such as a two-pronged AC power cord). The switch 22 is a normally-open switch which can be closed to turn on the heater-apparatus 14.

The heating-element 19 is a resistor that produces heat when an electrical current flows through the heating-element 19. The power-consumption and the voltage-drop of the heating-element 19 both allows the heating element 19 to generate sufficient heat—for example, sufficient heat to maintain a desired warmth of the liquid—and provides a power-loss or voltage-drop of a sufficient amount (e.g., a voltage-drop of between 80 volts and 90 volts) to allow the impeller-assembly 20 to operate safely. In some embodiments, the voltage-divider behavior of the heating-element 19 enables a low-voltage impeller-assembly 20 to operate in an approximately 110-120-volt AC (or equivalent) environment without additional components such as a voltage-regulator or power-supply unit.

The heating element 19, located inside the heater-blower apparatus 14, is connected to a rectifier circuit 36 that rectifies AC to direct-current ("DC") as required by the impeller-assembly 20. A DC-powered impeller-assembly 20 may be preferred, due to the larger size of AC-powered fans.

Figure 8:
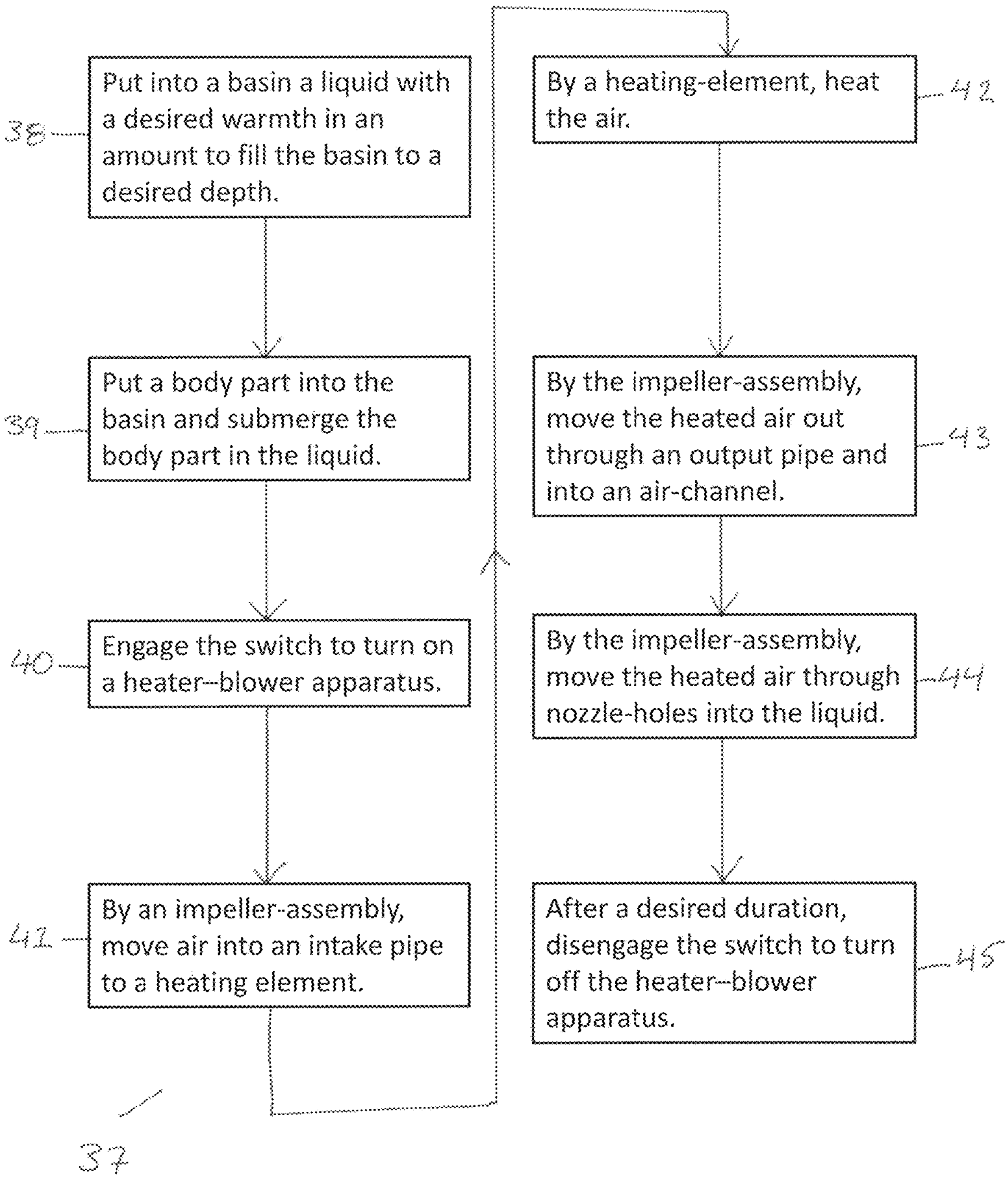
FIG. 8 is a flowchart of a method of using a system for treating wounds according to an exemplary embodiment of the present disclosure.

FIG. 8 is a flowchart of a method 37 of using a system 25 for treating wounds. The steps presented herein describe some of the steps in a typical process implemented by the systems and apparatus described above. In particular, the steps are illustrative of the major milestones or actions performed to achieve the resulting output. Not all minor, routine, or conventional steps are described.

In step 38, a user puts into the basin 1 a liquid with the desired warmth in the amount necessary to fill the basin 1 to a desired depth of liquid in the basin 1. In step 39, a user puts a body part into the basin 1 and submerges the body part in the liquid. In step 40, a user engages the switch 22 to turn on the heater-blower apparatus 14. In step 41, the impeller-assembly 20 moves air into the intake pipe 18 to the heating-element 19. In step 42, the heating-element heats the air. In step 43, the impeller-assembly 20 moves the heated air out through an output pipe 21 into an air-channel 4, 5. In step 43, the heated air moves through the nozzle-holes 28 into the liquid. In step 44, some of the heat of the heated air is transferred to the liquid. In step 45, after a desired duration, the user disengages the switch 22 to turn off the heater-blower apparatus.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

What is claimed is:

1. A device for treating wounds and skin infections and for promoting hygiene, comprising:

a heater-blower apparatus having a housing comprising an impeller-assembly and a heating-element, wherein the impeller-assembly comprises an intake pipe and an output pipe coupled thereto and is configured to move air into the intake pipe, across the heating-element, and out of the output pipe, wherein the heating-element is configured to heat air that moves across the heating-element;

a basin having a floor, a sidewall, a bottom surface, and an air-channel configured to receive the output pipe;

a stopper proximate the output pipe and configured to substantially stop liquid from moving out of the basin and into the heater-blower apparatus when the heater-blower apparatus is off, wherein the stopper is a rubber sphere configured to move up under the force of air-pressure when the heater-blower apparatus is on and to move down under the force of gravity when the heater-blower apparatus is off; and at least one nozzle-strip having one or more nozzle-holes and configured to attach to the floor of the basin and to substantially cover the air-channel.

2. The device of claim 1, wherein the basin has two air-channels and each air-channel has an output-pipe hole.

3. The device of claim 1, wherein the floor of the basin is shaped as a horseshoe and has a left-shank area and a right-shank area; and wherein the basin has a plateau substantially between the left-shank area and the right-shank area.

4. The device of claim 3, wherein the basin has a handle.

5. The device of claim 3, further comprising a switch positioned on the plateau of the basin.

6. The device of claim 3, further comprising a left nozzle-strip and a right nozzle-strip, wherein the basin has a left air-channel in the left-shank area and right air-channel in the right-shank area, and wherein the left nozzle-strip substantially covers the left air-channel and the right nozzle-strip substantially covers the right nozzle-strip.

7. The device of claim 6, wherein the heater-blower apparatus is configured to maintain a warmth of liquid in the basin for a desired duration.

8. The device of claim 7, wherein the heater-blower apparatus is configured to maintain a warmth of liquid in the basin of between 40 degrees Celsius and 35 degrees Celsius for a desired duration of at least 15 minutes.

9. The device of claim 6, wherein the heater-blower apparatus is configured to create an output air-pressure at the output pipe of between 2.0 pounds per square inch gauge and 10 pounds per square inch gauge.

10. The device of claim 1, further comprising a temperature-indicator configured to indicate a warmth of the liquid.

11. The device of claim 1, further comprising a liquid-level-mark on the sidewall of the basin at a liquid-height from the floor of the basin, wherein the liquid-height corresponds to a desired depth of liquid in the basin.

12. The device of claim 1, further comprising a bottom-cover having an intake-pipe hole, wherein the bottom-cover is attached to the basin and to substantially contain the heater-blower apparatus, and wherein the intake-pipe hole is configured to receive the intake pipe.

13. The device of claim 1, wherein the bottom-cover attaches to the basin by a snap-fit attachment between basin-fittings on the bottom surface of the basin and cover-fittings on the bottom-cover.

14. A device for treating wounds and skin infections and for promoting hygiene, comprising:

a heater-blower apparatus for heating air and for moving air, wherein the heater-blower apparatus has a heater-blower housing comprising a heating-element and an impeller-assembly, the impeller-assembly having an intake pipe and an output pipe coupled thereto, wherein the impeller-assembly is configured to move air into the intake pipe, across the heating-element, and out of the output pipe, wherein the heating-element is configured to heat air that moves across the heating-element;

a switch coupled to the heater-blower apparatus and configured to turn the heater-blower apparatus on and off;

a basin for holding a liquid, the basin comprising a floor, a sidewall, a bottom surface, and at least one air-channel, wherein the air-channel is a recess in the floor and has an output-pipe hole coupled to the output pipe;

a stopper proximate the output pipe and configured to substantially stop liquid from moving out of the basin and into the heater-blower apparatus when the heater-blower apparatus is off, wherein the stopper is a rubber sphere configured to move up under the force of air-pressure when the heater-blower apparatus is on and to move down under the force of gravity when the heater-blower apparatus is off;

at least one nozzle-strip having one or more nozzle-holes and that is coupled to the floor of the basin and substantially covers the at least one air-channel; and a bottom-cover having an intake-pipe hole, wherein the bottom-cover is coupled to the basin and substantially contains the heater-blower apparatus, and wherein the intake-pipe hole is coupled to the intake pipe.

15. The device of claim 14, wherein the floor of the basin is shaped as a horseshoe and has a left-shank area and a right-shank area; and wherein the basin has a plateau substantially between the left-shank area and the right-shank area.

16. The device of claim 14, wherein the at least one nozzle-strip comprises a left nozzle-strip and a right nozzle-strip; wherein the basin has a left air-channel in the left-shank area and having a left output-pipe hole; wherein the basin has a right air-channel in the right-shank area and having a right output-pipe hole; wherein the left nozzle-strip substantially covers the left air-channel and the right nozzle-strip substantially covers the right nozzle-strip; and wherein the stopper comprises a left stopper proximate the left output-pipe hole and a right stopper proximate the right output-pipe hole.

17. The device of claim 16, configured to maintain a warmth of liquid in the basin of between 40 degrees Celsius and 35 degrees Celsius for a desired duration of at least 15 minutes.

* * * * *